(12) United States Patent
Matsue et al.

(10) Patent No.: US 9,394,437 B2
(45) Date of Patent: Jul. 19, 2016

(54) POLYETHYLENE WAX AND BROMINATED POLYMER IN STYRENIC POLYMER

(71) Applicant: Dow Global Technologies LLC, Midland, MI (US)

(72) Inventors: Kenji Matsue, Utsunomiya (JP); Naganori Nishioka, Utsunomiya (JP)

(73) Assignee: Dow Global Technologies LLC, Midland, MI (US)

( * ) Notice: Subject to any disclaimer, the term of this patent is extended or adjusted under 35 U.S.C. 154(b) by 81 days.

(21) Appl. No.: 14/355,306

(22) PCT Filed: Nov. 26, 2012

(86) PCT No.: PCT/US2012/066508
§ 371 (c)(1),
(2) Date: Apr. 30, 2014

(87) PCT Pub. No.: WO2013/081958
PCT Pub. Date: Jun. 6, 2013

(65) Prior Publication Data
US 2014/0288203 A1    Sep. 25, 2014

(30) Foreign Application Priority Data

Dec. 2, 2011   (JP) .................. 2011-264399

(51) Int. Cl.
*C08J 9/00* (2006.01)
*C08L 47/00* (2006.01)
*C08L 25/06* (2006.01)

(52) U.S. Cl.
CPC ............... *C08L 47/00* (2013.01); *C08J 9/0061* (2013.01); *C08L 25/06* (2013.01); *C08J 2201/03* (2013.01); *C08J 2325/06* (2013.01); *C08J 2453/02* (2013.01); *C08J 2491/06* (2013.01)

(58) Field of Classification Search
CPC .. C08J 9/0061; C08J 2201/03; C08J 2325/06; C08J 2453/02; C08J 2491/06; C08L 25/06; C08L 47/00
See application file for complete search history.

(56) References Cited

U.S. PATENT DOCUMENTS

| 4,229,396 | A |   | 10/1980 | Suh et al. |
| 4,386,165 | A | * | 5/1983  | Suh .............. C08J 9/0019 521/146 |
| 2008/0287559 | A1 |   | 11/2008 | King et al. |

FOREIGN PATENT DOCUMENTS

| EP | 1605013    | 12/2005 |
| EP | 1957544    | 8/2008  |
| WO | 2011073141 | 6/2011  |

* cited by examiner

*Primary Examiner* — Irina S Zemel
(74) *Attorney, Agent, or Firm* — Steven W. Mork

(57) ABSTRACT

A polymer composition containing a polymer component containing styrenic polymer, a brominated vinyl aromatic/butadiene copolymer and a polyethylene wax, concentration of the polyethylene wax is 0.02 to 1.0 weight percent based on weight of the polymer component, the polyethylene wax has average molecular weight of 10,000 g/mol or less than 10,000 g/mol. The polymer composition can be a polymeric foam.

6 Claims, No Drawings

POLYETHYLENE WAX AND BROMINATED POLYMER IN STYRENIC POLYMER

TECHNICAL FIELD

This invention relates to styrenic polymeric compositions comprising polyethylene wax and a brominated vinyl aromatic/butadiene copolymer, polymeric foams containing such compositions and a process for preparing such foam.

BACKGROUND

To make a styrenic polymer foam, conventional low molecular weight brominated compound such as hexabromocyclododecane (HBCD) is typically used as a flame retardant. However, HBCD is facing governmental regulation over environmental concerns. Therefore, there is a need for an alternative flame retardant for use in styrenic foam.

U.S. patent application US2008/0287559A discloses the use of a brominated vinyl aromatic/butadiene copolymer as an alternative flame retardant to HBCD in styrenic foam. A challenge with using the brominated vinyl aromatic/butadiene copolymer is that it tends to nucleate cell growth during foaming to a larger degree than HBCD due to the dispersed particulate nature of the brominated vinyl aromatic/butadiene copolymer in the polystyrene matrix. As a result an undesired amount of nucleation can occur in polystyrene foam, which produces a greater number of cells, smaller cells and a higher density foam than foam made using HBCD.

U.S. Pat. No. 4,229,396 discloses natural and synthetic waxes as a cell size enlarger of an alkenyl aromatic resin. However, there is no suggestion that polyethylene wax is able to effectively work to produce larger cells in the presence of particulates by counteracting the nucleating effect of the particles (such as brominated vinyl aromatic/butadiene copolymer particles) during the formation of a styrenic polymer foam.

Additives such as cell size enlarger affect not only cell size and density of a polymeric foam but also other properties of a polymeric composition or a polymeric foam. It causes difficulty in forming a polymeric foam. For example, during forming a polymeric foam by extruder, output speed of a foam is affected by the properties of a polymeric composition such as smoothness of the surface of the composition. Less smoothness leads hardness of extrusion, but extreme smoothness leads slip of composition and decrease the speed of extrusion. The slip of composition causes the decline of productivity and deterioration of the obtained foam. Therefore, the combination of flame retardant and additives which shows required properties for polymeric composition and polymeric foam is important.

It is desirable to find an additive that would allow preparation of HBCD-free styrenic polymer foam comprising brominated vinyl aromatic/butadiene copolymer that has a larger cell size and lower density than a comparable styrenic polymer foam prepared in the absence of the additive. It is particularly desirable to prepare such a foam where the cell size is at least as large as comparable HBCD-containing styrenic polymer foam and the density as at least as low as a comparable HBCD-containing styrenic polymer foam, without affecting smoothness of a surface of a polymeric composition.

SUMMARY OF THE INVENTION

The present invention is made in view of the above-mentioned problems, and provides a solution to the problem of finding an additive that would allow preparation of HBCD-free styrenic polymer foam comprising brominated vinyl aromatic/butadiene copolymer that has a larger cell size and lower density than comparable styrenic polymer foam prepared in the absence of the additive, without affecting smoothness of a surface of a polymeric composition.

A first aspect of the present invention is a polymer composition comprising a polymer component comprising styrenic polymer, a brominated vinyl aromatic/butadiene copolymer and a polyethylene wax at a concentration of 0.02 to 1.0 weight percent based on weight of polymer component, wherein an average molecular weight of the polyethylene wax is 10,000 grams per mole (g/mol) or less than 10,000 g/mol. In a desirably embodiment, the polymer composition is a polymeric foam where the polymer component has cells defined therein.

A second aspect of the present invention is a process for preparing the foam of the particularly desirably embodiment of the first aspect.

EFFECT OF THE INVENTION

The present invention provides a solution to the problem of finding an additive that would allow preparation of HBCD-free styrenic polymer foam comprising brominated vinyl aromatic/butadiene copolymer that has a larger cell size and lower density than comparable styrenic polymer foam prepared in the absence of the additive. Moreover, the present invention is capable further solving the problems of preparing such foam where the cell size is at least as large as comparative HBCD-containing styrenic polymer foam, without affecting smoothness of a surface of a polymeric composition. The foam of the first aspect is useful for many foam application including thermal insulation.

DESCRIPTION OF EMBODIMENTS

Test methods refer to the most recent test method as of the priority date of this document when a date is not indicated with the test method number. References to test methods contain both a reference to the testing society and the test method number. The following test method abbreviations and identifies apply herein: JIS refers to Japanese Industrial Standard; ASTM refers to American Society for Testing and Materials; EN refers to European Norm, DIN refers Deutches Institute fur Normung; and ISO refers to International Organization for Standards.

"Multiple" means two or more. "And/or" means "and, or as an alternative". All ranges include endpoints unless otherwise indicated.

"Copolymer" refers to any combination of more than one monomer co-reacted to form a polymer. Copolymer can be random copolymers or block copolymers. Block copolymers can be of any type including diblock and triblock copolymers.

The polymer composition and polymeric foam of the present invention comprising a polymer component comprising styrenic polymer, a brominated vinyl aromatic/butadiene copolymer and a polyethylene wax.

(A) Styrenic Polymer

The styrenic polymer can be any one or more than one polymer selected from homopolymers of styrenic monomers and copolymers containing copolymerized styrenic monomer. Polystyrene homopolymer is the most preferable styrenic polymer for use in the present invention.

Examples of monomers which can be copolymerized with styrenic monomer to form suitable styrenic polymers for use in the present invention include any one or combination of more than one monomer selected from: styrene derivatives such as methyl styrene, dimethyl styrene, ethyl styrene, diethyl styrene, isopropyl styrene, bromo styrene, dibromo styrene, tribromo styrene, chloro styrene dichloro styrene or trichloro styrene; vinyl compounds such as vinyl toluene, vinyl xylene or divinyl benzene; unsaturated compounds such as acrylic acid, methacrylic acid, methyl acrylate, methyl methacrylate, ethyl acrylate, ethyl methacrylate, butadiene or acrylonitrile, or derivatives thereof; maleic anhydride and itaconic anhydride.

The styrenic polymer is preferably more than 50 weight-percent (wt %), more preferably 75 wt % or more and can be 90 wt % or more, 95 wt % or more and even 100 wt % based on the polymer component weight.

(B) Brominated Vinyl Aromatic/Butadiene Copolymer

The flame retardant used in the present invention is a brominated vinyl aromatic/ butadiene copolymer. Preferably, the brominated vinyl aromatic/butadiene copolymer is brominated styrene/butadiene copolymer because flame retardant effect of the brominated styrene butadiene copolymer is greater. The brominated styrene/butadiene copolymer includes brominated styrene/butadiene block copolymer, brominated random styrene/butadiene copolymer and brominated styrene/butadiene graft copolymer. Brominated triblock brominated vinyl aromatic/butadiene copolymer such as brominated styrene/butadiene/styrene block copolymer is more preferable. The brominated vinyl aromatic/butadiene copolymer is desirably one or more brominated butadiene/vinyl aromatic copolymer selected from those described and/or claimed in EP1957544B1.

The concentration of brominated vinyl aromatic/butadiene copolymer is desirably 0.25 wt % or more and generally 70 wt % or less based on weight of polymer component. The concentration of brominated vinyl aromaticbutadiene copolymer is preferably 1.0 wt % or more and 6.0 wt % or less, most preferably 2.0 wt % or more and 4.0 wt % or less based on weight of polymer component. At concentrations below 0.25 wt % the brominated vinyl aromaticbutadiene copolymer is generally not present at a high enough concentration to improve flame retardant properties of the polymer composition to a desirable extent. At concentrations above 70 wt %, the brominated vinyl aromatic/butadiene copolymer is at such a high concentration so as to often make processing difficult.

When the polymer composition is in the form of polymeric foam, the concentration of brominated vinyl aromatic/butadiene copolymer is desirably 0.25 wt % or more, preferably 1.0 wt % or more and more preferably 2.0 wt % or more at the same time desirably is 10 wt % or less, preferably 6 wt % or less, and more preferably 4 wt % or less based on weight of polymer component.

(C) Polyethylene Wax

The polyethylene wax used in the present invention can be a degraded wax, which is obtained by degradation of polyethylene, and an oxidized polyethylene wax, and is preferably a polyethylene wax polymerized by Ziegler catalyst. In the present invention, the average molecular weight of the polyethylene wax is 10,000 g/mol or less, preferably 6,000 g/mol or less, more preferably 500 g/mol to 6,000 g/mol. If the average molecular weight is more than 10,000 g/mol, the effect of cell size enlargement is low. The average molecular weight of the polyethylene wax is normally determined by GPC as compared to a polystyrene standards.

In addition, it is surprising that the polyethylene wax having 10,000 g/mol or less than 10,000 g/mol of average molecular weight does not decrease extruder screw loading of an extruder during forming a polymeric foam. Extruder screw loading is a barometer of the smoothness of a surface of a polymeric composition. Less smoothness leads difficulty of extrusion, but extreme smoothness leads slip of composition and decrease the productivity and deterioration of the obtained foam. Although waxes are known as a lubricating agents, the inventors found the polyethylene wax having 10,000 g/mol or less than 10,000 g/mol of average molecular weight does not decrease extruder screw loading of an extruder during forming a polymeric foam.

In the present invention, the concentration of a polyethylene wax is 0.02 to 1.0 wt % and preferably 0.03 to 0.7 wt % based on weight of polymer component. When the amount of a polyethylene wax is less than 0.02 wt %, the effect of enlarging cell sizes is low.

(D) Other Additives

In the present invention, the polymeric composition could further comprise other additives. Examples of other additives include stabilizers for a flame retardant, extrusion aids, pigment and inorganic fillers. Examples of stabilizer include magnesium oxide, epoxy resin, phosphate and epoxidized soybean oil. Examples of extrusion aids include metal salts of stearic acid such as barium stearate.

The polymeric foam of the present invention surprisingly has a cell size that is larger than a comparable foam without the polyethylene wax. Moreover, the polymeric foam of the present invention tends to have a cell size equal to or greater than a comparable foam comprising an equal amount HBCD instead of brominated alkyl aromatic/butadiene copolymer. The polymeric foam of the present invention desirably has an average cell size ("cell size") that is 0.1 millimeters (mm) or more and at the same time that is desirably 4.0 mm or less, preferably one mm or less, still more preferably 0.8 mm or less. Determine cell size according to ASTM method D-3576-04.

The polymeric foam can be either an open cell foam or a closed cell foam. Desirably, the styrenic polymer foam has an open cell content of 30 percent (%) or less, preferably 10% or less, still more preferably 5% or less, even more preferably one % or less and can be zero %. Determine open cell content according to ASTM method D6226-05. Open cell foams can contain greater than 30% open cell content.

Desirably, the polymeric foam has a density of 24 kilograms per cubic meter ($kg/m^3$) or more and at the same time desirably has a density of 80 kilograms per cubic meter ($kg/m^3$) or less, preferably 48 $kg/m^3$ or less. Determine density of the styrenic polymer by the following formula, [Density]= [weight of foam]/[volume of foam]. The volume of foam is determined from a water quantity removed when the foam is submerged. It is desirable to have a density of 24 $kg/m^3$ or more in order to ensure structural integrity. It is desirably to have a density of 80 $kg/m^3$ or less, especially 48 $kg/m^3$ or less for optimal thermal insulating properties.

Prepare the polymeric foam of the present invention by any foaming method suitable for preparing polymeric foam. In general the process for preparing the polymeric foam comprises: (a) melt blending the polymeric component with the brominated vinyl aromatic/butadiene copolymer, polyethylene wax and a blowing agent to form a foamable polymer composition; and (b) expanding the foamable polymer composition into polymeric foam. The blowing agent could be incorporated into the polymer component separately from other ingredients of the polymeric component. When additional additives are present, they are typically melt blended in to foam the foamable polymer composition in step (a).

Foaming process can be either batch or continuous processes. An example of a process suitable for the present invention is; blending the polymeric component with brominated vinyl aromatic/butadiene copolymer and other ingredients excepting blowing agent, adding forming agent to the above blended composition at a pressure of 110 to 200 kg/cm² followed by melt blending the all component in an extruder, cooling the melt blended component uniformly, and expanding the cooled composition through a die into an atmosphere pressure to form a foamable polymeric composition.

The melting temperature of melt blending the polymeric component with other ingredients is 160 to 240° C., preferably 170 to 230° C., and more preferably 180 to 220° C. When blowing agent is pressed into polymeric composition, the pressure of pressed in the extruder is 110 to 200 kg/cm², and more preferably 120 to 185 kg/cm². The solid ingredients melted by the extruder and the blowing agents are mixed by a mixer (extruder speed: 20 to 40 rpm, more preferably 25 to 35 rpm), and slowly cooled by a cooler. The optimum temperature when the melt blended composition is cooled and foamed is 100 to 130° C., and more preferably 110 to 127° C.

The blowing agent is typically selected from organic blowing agents, inorganic blowing agents and chemical blowing agents. Desirably, the blowing agent comprises or consists of one or more than one saturated hydrocarbon having 3 to 5 carbon atoms.

Examples of saturated hydrocarbon having 3 to 5 of carbon atoms are: propane, normal-butane, iso-butane, industrial butane (mixture of normal-butane and iso-butane), normal-pentane, iso-pentane, cyclopentane and neopentane. Preferable hydrocarbon having 3 to 5 carbon atoms is normal-butane or iso-butane because of blowing effect and insulating effect of obtained foam. The most preferable hydrocarbon having 3 to 5 carbon atoms is iso-butane. The concentration of saturated hydrocarbon having 3 to 5 carbon atoms is preferably 1 to 10 parts by weight based on 100 parts by weight of styrenic polymer, more preferably, 1.5 to 5 parts by weight based on 100 parts styrenic polymer in order to obtain both quality insulating effect and flame retardant effect.

Examples of other organic blowing agents include: alkyl chlorides such as methyl chloride or ethyl chloride; ethers such as dimethyl ether, diethyl ether, methyl ethyl ether, iso-propyl ether, normal butyl ether, di-isopropyl ether, furan, furfural, 2-methyl furan, tetrahydrofuran or tetrahydropyran; ketones such as dimethyl ketone, methyl ethyl ketone, diethyl ketone, methyl normal-propyl ketone, methyl normal-butyl ketone, methyl iso-butyl ketone, methyl normal-amil ketone, methyl normal-hexyl ketone, ethyl normal-propyl ketone or ethyl normal-butyl ketone; alcohols such as methanol, ethanol, normal-propanol, iso-propanol, normal-butanol, iso-butanol or tertiary-butanol; and carbonic esters such as methyl formate, ethyl formate, propyl formate, butyl formate, amyl formate, methyl propionate or ethyl propionate.

Examples of inorganic blowing agents include carbon dioxide and water. Example of chemical blowing agents include azo compound. These blowing agents could be used alone or as a mixture of more than two blowing agents. Suitable other blowing agents include methyl chloride, ethyl chloride and dimethyl ether.

The total concentration of blowing agents is, preferably, 0.5 to 20 wt % based on weight of polymeric component.

EXAMPLES

Examples 1 to 3 and Comparative Examples A and B

The polymer composition was polystyrene homopolymer with a weight average molecular weight of 210,000 g/mol. The brominated alkyl aromatic/butadiene copolymer was a brominated styrene/butadiene/styrene block copolymer that is 64 wt % bromine and that has a softening point of 120 degrees Celsius (° C.), molecular weight of 100,000-160,000 g/mol and a 5% weight loss temperature by thermogravimetric analysis of 262° C. (Br-SBC, for example EMERALD INNOVATION™ 3000, EMERALD INNOVATION is a trademark of Chemtura Corporation). Polyethylene wax was polyethylene wax with a weight average molecular weight of 6,000 g/mol (LICOWAX™ PE520 supplied from Clariant Corporation).

For Examples (Ex) 1 through 3 and Comparative Examples (Comp Ex) A, use the brominated alkyl aromatic/butadiene copolymer as a flame retardant additive at a concentration of 2.85 wt % based on polystyrene homopolymer weight. For Exs 1 through 3, further include 0.05, 0.20 and 0.40 wt % polyethylene wax respectively based on weight of polystyrene homopolymer.

Comp Ex B includes hexabromocyclododecane (HBCD) as a flame retardant additive at 2.5 wt % based on polystyrene homopolymer weight in place of the brominated alkyl aromatic/butadiene copolymer and does not include any polyethylene wax.

For Ex 1 through 3, feed polystyrene homopolymer, brominated styrene/butadiene/styrene block copolymer, polyethylene wax along with remaining additives as identified in Table 1 into a hopper of an extruder with four heating zones, a blowing agent mixing section, cooler section with three heating zones and adjustable slit die. Melt blend the components in the extruder with the four heating zones set at 110° C., 140° C., 185° C. and 200° C. respectively. Inject a blowing agent composition (carbon dioxide, Industrial butane (35/65 mix of isobutene/normal butane), and ethyl chloride at ratios in Table 1) into the mixture in the blowing agent mixing section to form a foamable polymer composition. Mix the foamable polymer composition, then feed into the cooler section set at 140° C., 135° C. and 125° C. respectively. Cool the foamable polymer composition uniformly and extrude through a slit die set at 100° C. into atmospheric pressure and allow to expand into polymeric foam. Additives used in Ex 1 are; an epoxy cresol novolac resin (CN type resin, Product name is ARALDITE ECN1280, supplied from Huntsman Japan), a phosphate (DOVERPHOS S-9228, supplied from Dover Chemical Corporation) and an epoxidized soybean oil (Plas-Check 775, supplied from Ferro Corporation) as stabilizers, barium stearate as a lubricating agent and phthalocyanine blue as a colorant.

Prepare Comp Ex A in like manner as Example 1-3 except do not include the polyethylene wax.

Prepare Comp Ex B in like manner as Example 1-3 except do not include either of the polyethylene wax and brominated styrene/butadiene/styrene block copolymer and instead includes HBCD as a flame retardant. As stabilizer, magnesium oxide is used instead of epoxy cresol novolac resin, phosphate and epoxidized soybean oil.

Determine density of the styrenic polymer by the following formula, [Density]=[weight of foam]/[volume of foam]. The volume of foam is determined from a water quantity removed when the foam is submerged. The average cell size diameter is determined by average value of thickness, width and length directions of cell size according to ASTM method D 3576. The results are shown in Table 1.

The foam characteristics reveal that Polyethylene wax effectively counteracted the nucleating effect of Br-SBC (compare Ex 1-3 to Comp Ex A) and to such an effect as to even produce a foam having a larger cell size than foam made using HBCD (compare Ex 1-3 to Comp Ex B).

TABLE 1

|  |  | Ex 1 | Ex 2 | Ex 3 | Comp Ex A | Comp Ex B |
|---|---|---|---|---|---|---|
| Flame retardant | Br-SBC | 2.8 | 2.8 | 2.8 | 2.8 | — |
|  | HBCD | — | — | — | — | 2.5 |
|  | Bromine content | 1.9 | 1.9 | 1.9 | 1.9 | 1.9 |
| Stabilizer | CN type epoxy resin | 0.48 | 0.48 | 0.48 | 0.48 | — |
|  | Phosphate | 0.28 | 0.28 | 0.28 | 0.28 | — |
|  | Epoxidized soybean oil | 0.24 | 0.24 | 0.24 | 0.24 | — |
|  | Magnesium oxide | — | — | — | — | 0.03 |
| Polyethylene wax | Licowax PE520 | 0.05 | 0.20 | 0.40 | — | — |
| Lubricating agent | Barium stearate | 0.10 | 0.10 | 0.10 | 0.10 | 0.07 |
| Colorant | Phthalocyanine blue | 0.10 | 0.10 | 0.10 | 0.10 | 0.10 |
| Blowing agent | Industrial butane | 2.0 | 1.9 | 2.0 | 1.9 | 2.0 |
|  | Ethyl chloride | 4.0 | 3.9 | 4.0 | 3.9 | 4.0 |
|  | Carbonic dioxide | 2.7 | 2.6 | 2.7 | 2.6 | 2.7 |
| Characteristics of foam | Density with skins (kg/m$^3$) | 37 | 38 | 38 | 38 | 37 |
|  | Average cell size diameter (millimeters) | 0.43 | 0.51 | 0.65 | 0.21 | 0.45 |

In table 1, unit of each number for ingredients (flame retardant, stabilizer, polyethylene wax, lubricating agent, colorant and blowing agent) is wt % based on polystyrene homopolymer weight.

Example 4 to 7 and Comparative Example C to G

The effect on Average Cell size and Extruder screw loading during forming a polymeric foam for many waxes are tested.

Prepare Ex 4-7 and Comp Ex C-G in like manner as Example 1 excepting include each cell size enlargement shown in Table 3 instead of Licowax PE520. The amount of each ingredients for each examples is also shown in Table 3. The properties of waxes are shown in Table 2.

TABLE 2

|  |  | Melting point (° C.) | Average molecular weight (g/mol) | Other properties |
|---|---|---|---|---|
| Polyethylene wax | Hi WAX 220P | 113 | 2,000 | low density polyethylene |
|  | Hi WAX 200P | 130 | 2,000 | High density polyethylene |
|  | Licowax PE130 | 127-132 | 4,800 |  |
|  | Licowax PE520 | 117-123 | 6,000 |  |
|  | Licowax PE190 | 132-138 | 18,000 |  |
| Natural wax | Candelilla wax | 68-72 | — |  |
|  | Rice wax | 78-82 | — |  |
|  | Carnauba wax | 80-86 | — |  |

Hi WAX 220P and Hi WAX 200P are manufactured by Mitsui Chemical co. Ltd. Licowax PE130 and Licowax PE190 are manufactured by Clariant co. Ltd.

Extruder screw loading was determined by the following formula.

Extruder screw loading=(Actual throughput weight of foam per hour (kg/h))/rotation frequency of extruder (rpm)

Actual throughput weight of foam per hour (kg/h)= (measured output weight of foam per hour (kg/h))−(weight of injected foaming agent per hour (kg/h))

TABLE 3

|  |  | Ex 4 | Ex 5 | Ex 6 | Ex 7 | Comp Ex C | Comp Ex D | Comp Ex E | Comp Ex F | Comp Ex G |
|---|---|---|---|---|---|---|---|---|---|---|
| Flame retardant | Br-SBC | 2.2 | 2.2 | 2.2 | 2.2 | 2.2 | 2.2 | 2.2 | 2.2 | 2.2 |
| Stabilizer | CN type epoxy resin | 0.37 | 0.37 | 0.37 | 0.37 | 0.37 | 0.37 | 0.37 | 0.37 | 0.37 |
|  | Phosphate | 0.22 | 0.22 | 0.22 | 0.22 | 0.22 | 0.22 | 0.22 | 0.22 | 0.22 |
|  | Epoxidized soybean oil | 0.18 | 0.18 | 0.18 | 0.18 | 0.18 | 0.18 | 0.18 | 0.18 | 0.18 |
| Waxes | Hi wax 220P | 0.3 |  |  |  |  |  |  |  |  |
|  | Hi wax 200P |  | 0.3 |  |  |  |  |  |  |  |
|  | Licowax PE130 |  |  | 0.3 |  |  |  |  |  |  |
|  | Licowax PE520 |  |  |  | 0.3 |  |  |  |  |  |
|  | Licowax PE190 |  |  |  |  | 0.3 |  |  |  |  |
|  | Candelilla wax |  |  |  |  |  | 0.3 |  |  |  |
|  | Rice wax |  |  |  |  |  |  | 0.3 |  |  |
|  | Carnauba wax |  |  |  |  |  |  |  | 0.3 |  |
| Lubricating agent | Barium stearate | 0.1 | 0.1 | 0.1 | 0.1 | 0.1 | 0.1 | 0.1 | 0.1 | 0.1 |
| Colorant | Phthalocyanine blue | 0.1 | 0.1 | 0.1 | 0.1 | 0.1 | 0.1 | 0.1 | 0.1 | 0.1 |
| Blowing agent | Industrial butane | 1.90 | 2.0 | 2.0 | 2.0 | 2.0 | 2.0 | 2.1 | 2.0 | 2.1 |
|  | Ethyl chloride | 3.9 | 3.9 | 4.0 | 4.0 | 4.0 | 4.0 | 4.0 | 4.0 | 4.1 |
|  | Carbonic dioxide | 2.6 | 2.6 | 2.7 | 2.7 | 2.7 | 2.7 | 2.7 | 2.8 | 2.7 |
| Extruder screw loading (kg/h · rpm) |  | 0.26 | 0.26 | 0.28 | 0.23 | 0.17 | 0.15 | 0.14 | 0.15 | 0.22 |
| Characteristics of foam | Density without skins (kg/m$^3$) | 48.6 | 43.8 | 40.4 | 40.3 | 41.7 | 37.3 | 28.1 | 29.2 | 40.8 |
|  | Average cell size diameter (millimeters) | 0.94 | 0.89 | 0.73 | 0.66 | 0.57 | 0.53 | 0.50 | 0.54 | 0.20 |

In table 3, unit of each number for ingredients (flame retardant, stabilizer, waxes, lubricating agent, colorant and blowing agent) is wt % based on polystyrene homopolymer weight.

Many polyethylene waxes having an average molecular weight of 10,000 or less than 10,000 effectively counteracted the nucleating effect of Br-SBC (Ex 4-7) without affecting Extruder screw loading (compare Ex 4-7 to Comp Ex G). Cell size of the foam comprising polyethylene wax having 18,000 of Average molecular weight or natural wax is smaller than the one comprising polyethylene wax having 10,000 or less than 10,000, at the same time Extruder screw loading is lower. (compare Ex 4-7 to Comp Ex C-F)

Example 8 and Comparative Example H and I

The effect on Average Cell size for high pressure foam of JIS A9511 thermal insulation board class 3 is tested.

Prepare Ex 8 in like manner as Example 1 excepting using isobutene instead of Industrial butane. The amount of each ingredient is shown in Table 4.

Prepare Comp Ex H in like manner as Example 8 except do not include the polyethylene wax.

Prepare Comp Ex I in like manner as Example 8 except do not include either of the polyethylene wax and brominated styrene/butadiene/styrene block copolymer and instead includes HBCD as a flame retardant. As stabilizer, magnesium oxide is used instead of epoxy cresol novolac resin, phosphate and epoxidized soybean oil. The results are also shown in Table 4.

TABLE 4

| | | Ex 8 | Comp Ex H | Comp Ex I |
|---|---|---|---|---|
| Flame retardant | Br-SBC | 3.6 | 3.6 | — |
| | HBCD | — | — | 3.1 |
| | Bromine content | 2.3 | 2.3 | 2.3 |
| Stabilizer | CN type epoxy resin | 0.59 | 0.59 | — |
| | Phosphate | 0.35 | 0.35 | — |
| | Epoxidized soybean oil | 0.29 | 0.29 | — |
| | Magnesium oxide | — | — | 0.03 |
| Polyethylene wax | Licowax PE520 | 0.05 | — | — |
| Lubricating agent | Barium stearate | 0.10 | 0.10 | 0.07 |
| Colorant | Phthalocyanine blue | 0.08 | 0.08 | |
| Blowing agent | Iso butane | 3.0 | 3.0 | 3.0 |
| | Ethyl chloride | 2.3 | 2.3 | 2.3 |
| | Carbonic dioxide | 1.7 | 1.7 | 1.7 |

TABLE 4-continued

| | | Ex 8 | Comp Ex H | Comp Ex I |
|---|---|---|---|---|
| Characteristics of foam | Density without skins ($kg/m^3$) | 46 | 42 | 44 |
| | Average cell size diameter (millimeters) | 0.33 | 0.13 | 0.26 |

In table 4, unit of each number for ingredients (flame retardant, stabilizer, polyethylene wax, lubricating agent, colorant and blowing agent) is wt % based on polystyrene homopolymer weight.

The foam characteristics reveal that Polyethylene wax effectively counteracted the nucleating effect of Br-SBC (compare Ex 8 to Comp Ex H) and to such an effect as to even produce a foam having a larger cell size than foam made using HBCD (compare Ex 8 to Comp Ex I).

What is claimed is:

1. A polymer composition comprising a polymer component comprising styrenic polymer, a brominated styrene/butadiene copolymer and a polyethylene wax, concentration of the polyethylene wax is 0.03 to 0.4 weight percent based on weight of the polymer component, and the weight average molecular weight of the polyethylene wax is 10,000 g/mol or less and wherein the styrenic polymer is a homopolymer of styrenic monomer and wherein the concentration of brominated styrene/butadiene copolymer is one to four weight percent based on weight of the polymer component.

2. The composition of claim 1, wherein the weight average molecular weight of the polyethylene wax is 6,000 g/mol or less.

3. The composition of claim 1, wherein the brominated styrene/butadiene copolymer is a brominated styrene/butadiene/styrene triblock copolymer.

4. The composition of any of claim 1, wherein the polymer composition is an extruded polymeric foam.

5. The composition of any of claims 1, wherein the composition is in the form of a polymeric foam wherein the polymer component has cells defined therein.

6. A process for preparing the polymeric foam of claim 4, the process comprising: (a) melt blending the polymer component with the brominated styrene/butadiene copolymer, polyethylene wax and a blowing agent to form a foamable polymer composition; and (b) expanding the foamable polymer composition into a polymeric foam.

* * * * *